Dec. 17, 1935.  W. E. ELLENS  2,024,820
METHOD OF AND MACHINE FOR MANUFACTURING BAGS OR ENVELOPES
Filed Nov. 19, 1932  6 Sheets-Sheet 1

INVENTOR
William Edwin Ellens
BY
Victor D. Borst
ATTORNEY

Dec. 17, 1935.  W. E. ELLENS  2,024,820
METHOD OF AND MACHINE FOR MANUFACTURING BAGS OR ENVELOPES
Filed Nov. 19, 1932  6 Sheets-Sheet 2

INVENTOR
William Edwin Ellens
BY
Victor D. Borst
ATTORNEY

Dec. 17, 1935.  W. E. ELLENS  2,024,820
METHOD OF AND MACHINE FOR MANUFACTURING BAGS OR ENVELOPES
Filed Nov. 19, 1932  6 Sheets-Sheet 3

INVENTOR
William Edwin Ellens
BY
Victor D. Borst
ATTORNEY

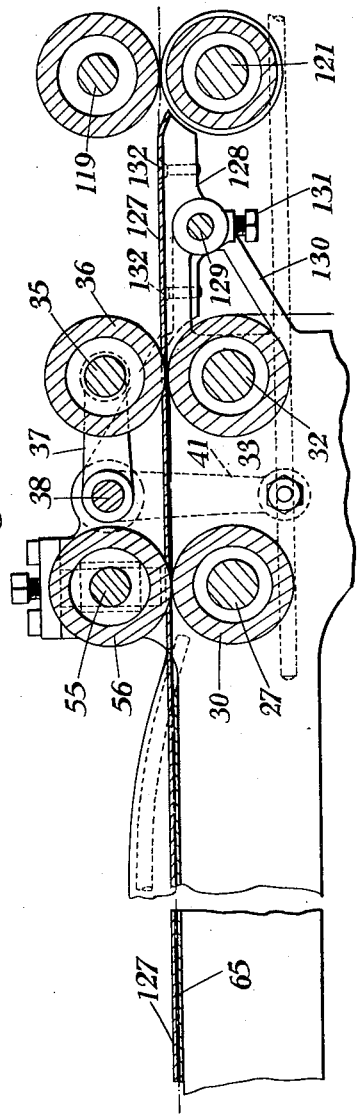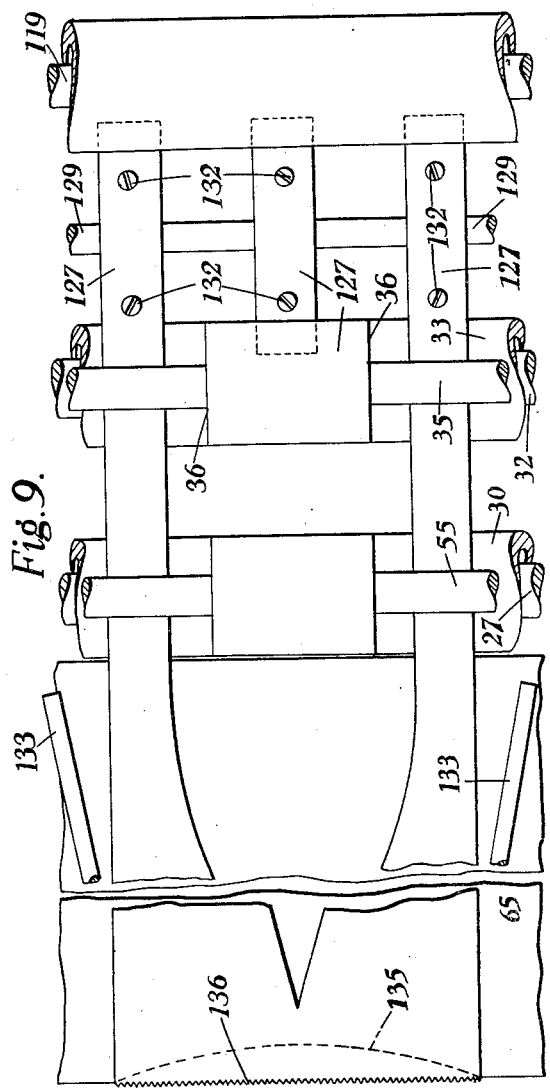

Dec. 17, 1935.  W. E. ELLENS  2,024,820
METHOD OF AND MACHINE FOR MANUFACTURING BAGS OR ENVELOPES
Filed Nov. 19, 1932   6 Sheets-Sheet 5

INVENTOR
William Edwin Ellens
BY
Victor D. Borst
ATTORNEY

Dec. 17, 1935.　　　　W. E. ELLENS　　　　2,024,820
METHOD OF AND MACHINE FOR MANUFACTURING BAGS OR ENVELOPES
Filed Nov. 19, 1932　　6 Sheets-Sheet 6

INVENTOR
BY
ATTORNEY

Patented Dec. 17, 1935

2,024,820

UNITED STATES PATENT OFFICE 2,024,820

METHOD OF AND MACHINE FOR MANUFACTURING BAGS OR ENVELOPES

William Edwin Ellens, Berkhamsted, England, assignor to John Dickinson & Co., Limited, Herts, England, a company of England Application November 19, 1932, Serial No. 643,357
In Great Britain December 21, 1931

5 Claims. (Cl. 93—19)

This invention refers to a method of and a machine for manufacturing bags and envelopes, the object of which is to produce bags or envelopes having the entire face portion, or any part thereof, of transparent or semi-transparent material while the remainder of same may be of opaque material. Heretofore, bags of the type referred to, have been produced by machine methods and in the production of same a composite web has been utilized as the base material for the said bag. The said composite web has been constructed from two or more separate webs adhesively joined at their respective edges, one or more of said separate webs being of transparent material and the remainder of opaque material. The great disadvantage of utilizing the said composite web for the purpose of bag production, is that bags made from this material are limited with regard to the shape of the respective cut edges forming the opening of the said bag, and also with regard to the co-acting edges which are subsequently turned over to form the bottom closure, and which is adhesively joined to one surface at that part forming the body of the bag. The bags as hereinbefore referred to are almost universally produced in the form of a tube from the said composite web, the edges of same being adhesively joined during the run of the web through the machine, the tube being of the plain variety, or same being turned in at each edge to the end that the resultant bag may be of the gusset type.

For the purpose of separating the said adhesively joined tube into bag lengths, a swinging rotating knife is caused to cut laterally across the tube during the passage through the machine and the said knife must perforce cut through the whole of material of the composite web.

The expression cut, is only relative, as actually the rotating knife is not usually sharp, but is provided with a square edge which in its operation forces the paper forming the tube against an edge of a plate over which the tube is travelling, the said edge sometimes being serrated in saw tooth fashion to the end that the cut edge of the paper may present a like finish. A second plate is sometimes continued into the tube formation to the end that the extreme end of same might be adapted to form the cutting medium for the upper surface of the tube formation, leaving the first mentioned plate to effect the cutting of the lower surface of tube formation.

The said arrangement of a double plate provides a means of obtaining a bag, whereof one edge of the opening is slightly longer than the other, the co-acting edges of the other end of the bag being of course cut in the reverse positions and providing a means of securely affixing the two turned over layers of paper, to the body of bag by means of adhesive.

It will be realized that in order that one edge of the tube at the base of the bag may overlap the other edge for the purpose, already referred to, of providing a securing means, it is essential that the overlapping relation of the respective edges, at top and bottom of bag, coincide and that therefore the overlap at the top is limited to that required at the bottom.

The production of bags according to the present invention enables a freedom of choice to be obtained with respect to the shape or dimension of both top and bottom overlap, and in order to secure this result, the tube is formed from a web of either transparent or opaque material and there are placed in predetermined positions cut sections of the opposite kind of paper to that carried in the web, the cut sections being of a length or width that will allow of a desired amount of overlap at either end or at the side of the bag when the web of opposite kind of paper is separated in the usual way by the rotating knife, operating as hereinbefore described.

It is to be understood that the first cut sections of paper, either opaque or transparent, are laid in succession and securely affixed in registered position to the web passing through the machine and that the knife passes through the web only. By these means and by varying the length of the first cut sections the desired amount of overlap at either end and/or at each side of such section may be regulated and secured. The said cut sections of paper may be obtained from another web passing through the machine at a slower rate of progress, utilizing suitable mechanism for effecting the attachment of each cut section after its separation from the running web.

It will be realized by those acquainted with the art to which the invention relates that high class printing is not usually possible of accomplishment in bag making machines as herein described and in ordinary use in the production of bags of the kind above referred to.

The employment, however, of previously printed cut sections according to the invention enables bags to be produced provided with high class printing.

It is to be understood that the term bag in the present specification includes the commercial articles usually associated with the term, and that the invention admits of the production of bags having any desired shape of overlapping extremity at the opening and further that the production of envelopes or pockets provided with a flap in the usual manner of envelopes may be effected. The invention therefore includes the production of both bags and envelopes.

Any suitable mechanism may be utilized for the production of bags according to the invention but for the better understanding thereof the following typical arrangement is given as an example:—

Assuming the material in web form to be of a transparent character a reel thereof is mounted on a central spindle which is carried in brackets at the rear of the machine and adapted to revolve, as the material is drawn from the reel; the said material being passed over rollers and carried over an approximately horizontal flat surface.

A web of opaque material is drawn from a second reel mounted as hereinbefore described and carried over the transparent web, the cut end of the opaque web being directed under a rotating roll that is provided with a gap and which is mounted in a suitable position over the running transparent web. The travelling speed of the opaque web is capable of variation and, normally, is slower than that of the transparent web. The gap provided roll is adapted to receive the end of the opaque web under itself and to grip the same, together with the transparent web between itself and a second rotating roll positioned under the transparent web, the surface speed of the said rolls coinciding with the speed of the transparent web.

As the controlled speed of the opaque web is less than the surface speed of the said rolls, the action of gripping the two webs together exerts a strain on the opaque web and breaks the same at a point of weakening thereof previously and periodically imposed in predetermined positions and comprising a line of perforation. The detached portion of opaque web is carried by the transparent web under the control of a series of rollers and the edge of transparent web is caused to turn over and to be adhesively attached to the detached opaque portion by lines of gum or other adhesive.

The turning over of the edge of the transparent web may be effected by well known devices adapted for manipulation so as to form either a plain satchel bag or a gusset bag. From this point the travelling transparent web with adhesively attached section of the opaque web is carried through the well known bag machine cross cutting mechanism and the bottom pasting and closuring mechanism, the delivery of the completed bag or envelope being effected in the usual manner.

It will be understood by those engaged in the art to which the invention relates that the dimensions of the top and bottom flaps, if any, will be in accordance with the variation of the respective speeds of the transparent and opaque webs, and also in accordance with the timing of the points of impact of the cross cutting knife. Instead of imposing a line of perforations to effect the severance of the section of opaque web, cutting mechanism may be provided whereby the opaque web is severed at the moment of being gripped by the gap provided and co-acting rolls.

Instead of the gap provided roll a roll may be adapted to be periodically removed from contact with its co-acting roll to serve as a means of progressing the cut section and may print or decorate bags or envelopes produced according to the invention in any known manner.

In order that the invention may be readily understood and carried into effect, same will now be more fully described with reference to the accompanying drawings which illustrate only those details of the mechanism that are necessary to the understanding thereof and in which:—

Figure 8 illustrates an arrangement of plate device for use when one edge of the opening in the completed bag is required to be of different shape to the other edge thereof.

Figure 9 is a plan view in part corresponding with Figure 8.

A reel 1 of material such as paper is mounted in suitably positioned standards (not shown) on a spindle 2 which carries wedge castings 3 to enable satisfactory positioning of the reel to be effected, the said spindle 2, being revolubly mounted in suitable bearings (not shown) having provision for axial direction control of the reel, and means to apply a variable pressure to a brake for the control of the reel when revolving.

Figure 1:
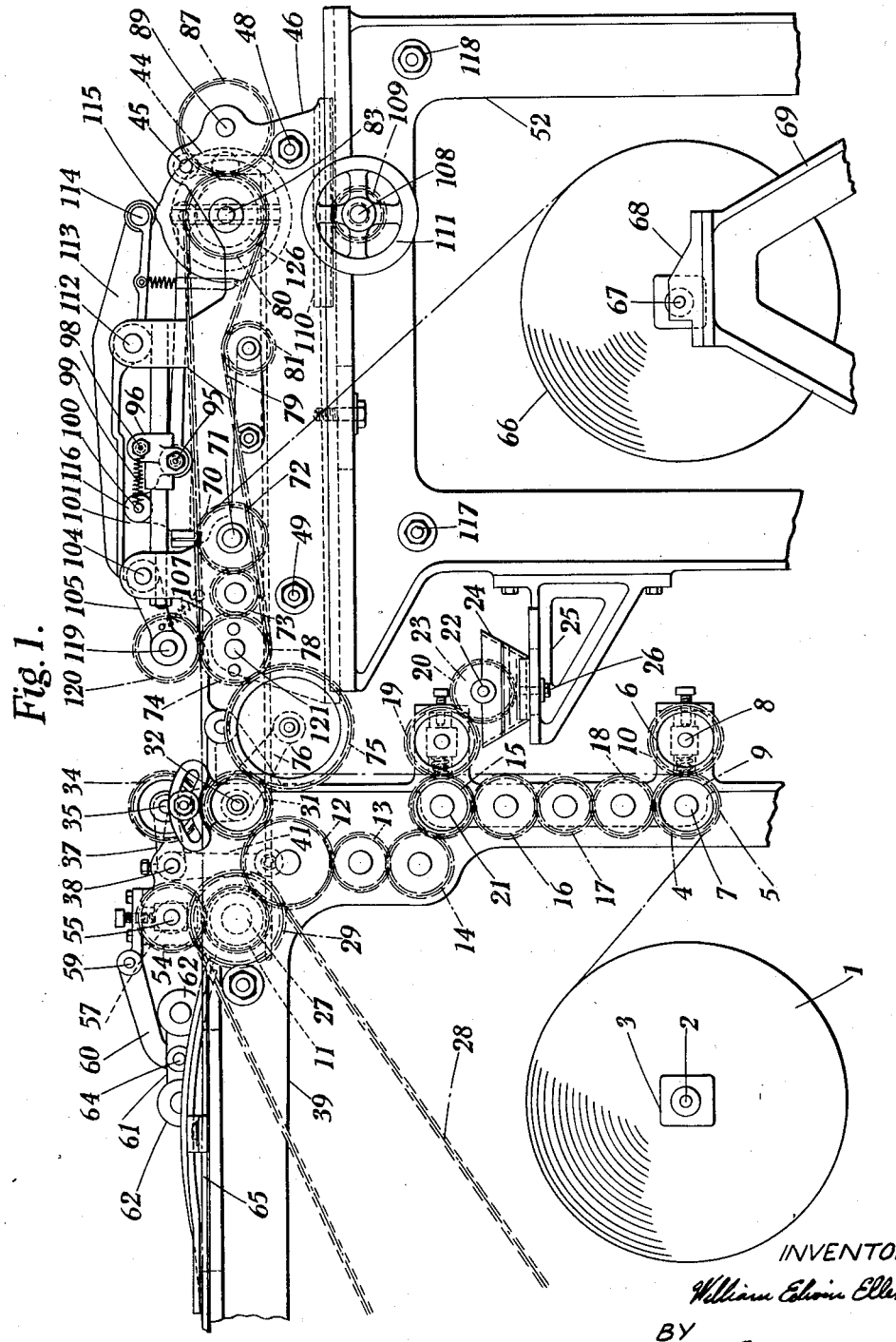
Figure 1 is a side elevation of a portion of the bag making machine showing the cut piece attaching section thereof.
Figure 2:
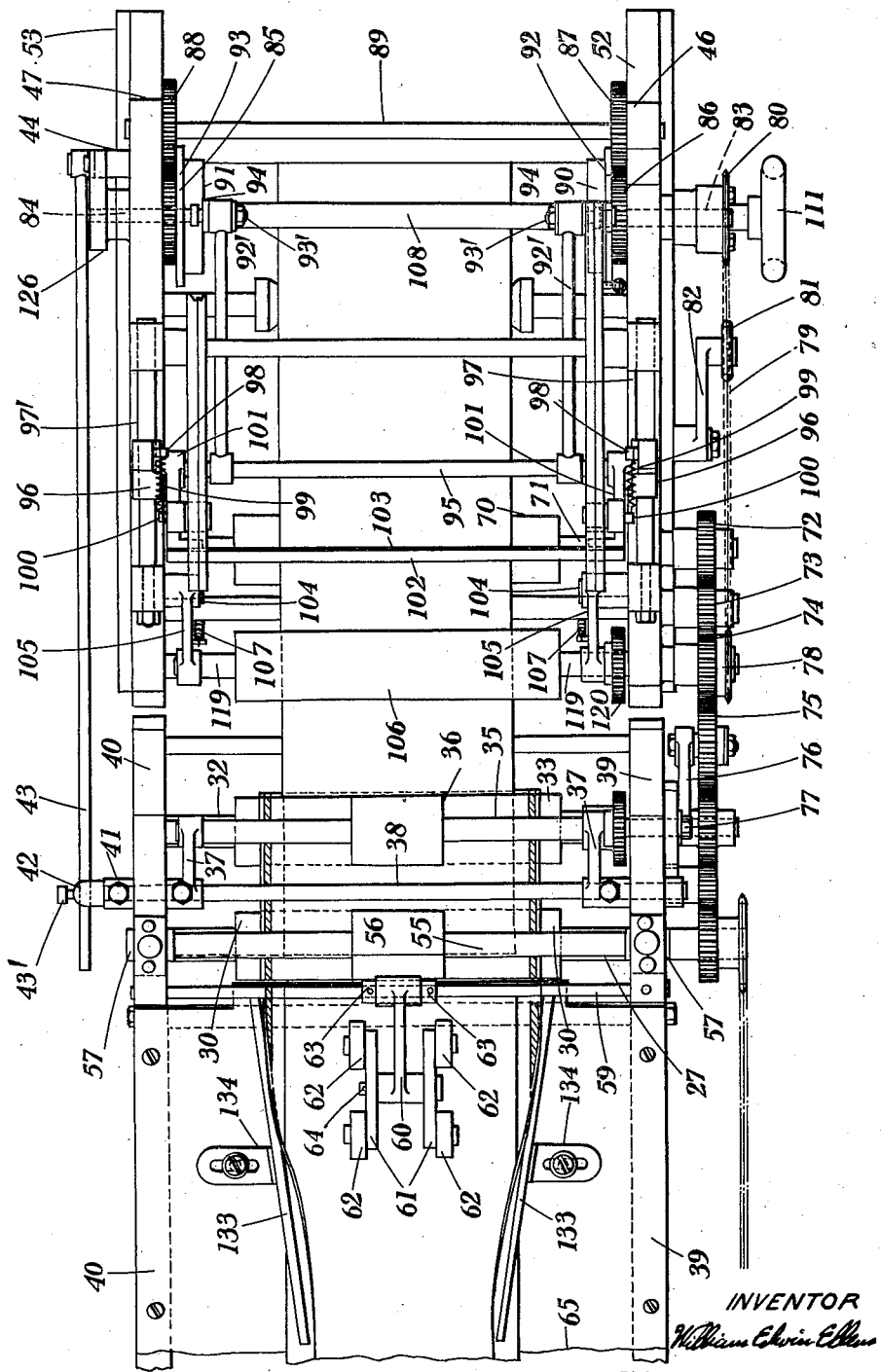
Figure 2 is a corresponding plan.
Figure 3:
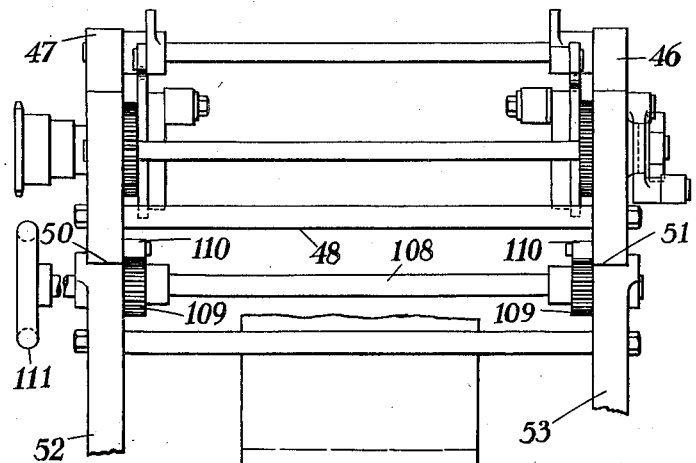
Figure 3 is a fractional end view corresponding with Figure 1.

The paper is led from the reel 1, under a roll 4, the said roll 4, being provided with female creasing discs 5, which are adapted to co-act in a rotary manner with male creasing discs 6, the shafts of the creasing device 7, 8 carrying gears 9, 10, respectively and the said gears being driven from gear wheel 11 through the train of gears 12, 13, 14, 15, 16, 17 and 18. Gear wheel 15 carried on shaft 21, drives gear wheels 19, 20 the latter of which is fast on the shaft 22 and drives a gum roll 23 adapted to revolve in gum tank 24. Gum tank 24 is adjustably mounted on brackets 25, being held thereon by screws 26 passing through the slotted surface of brackets 25. Shaft 27 pertaining to gear wheel 11 is driven by chain 28, passing over chain wheel 29. Roller 30 (Figure 2) is fixed to shaft 27. Gear wheel 12 in mesh with gear wheel 31, drives shaft 32 carrying roller 33. Gear wheel 31 meshes with gear wheel 34 secured on end of shaft 35 on which the roller 36 is securely fixed. Shaft 35 is revolubly mounted in levers 37, 37, the said levers being securely fixed to shaft 38, passing through side frames 39, 40; and pin 42 freely mounted in lever 41, carries rod 43 arranged for adjustment in the pin 42 by means of the screw 43' the reverse end of rod 43 being connected to lever 44 carried on pin 45 mounted in sliding frame 46. Frame parts 46 and 47, held in spaced relation by stretched bars, 48, 49 (Figure 1) are adapted to slide on the recessed surfaces 50, 51 of secondary frames 52, 53. Gear wheel 54 secured to end of shaft 55 is driven by gear wheel 11. Roller 56 is mounted on shaft 55. Shaft 55 is carried in bearings 57, 57, mounted in side frames 39, 40. Bearing caps 58, 58 carry shaft 59 and collars 63 fixed thereto locate arm 60 centrally on shaft 59. Brackets 61, 61 connected together by pin 64 carry pressure rollers 62, 62, 62, 62 resting and pressing on plate 65 secured at each edge to upper surfaces of frames 39, 40. Supplementary reel 66 carried on spindle 67 is suitably mounted and controlled in bearings 68, carried on pedestal supports 69. The web from reel 66 is carried on roll 70 on shaft 71 which is revolubly mounted in the frames 46, 47. Shaft 71 is driven by gear wheel 72 securely fixed to the end thereof, and the gear wheel 72 is driven through the train of gears 73, 74, 75, the gear wheel 75, being secured to the end of quadrant lever 76, and meshing with gear wheel 31 and gear wheel 74 secured to the end of shaft 121. Quadrant lever 76 is adjustably secured to side frame 39 by screw 77. Chain wheel 78 secured to face of gear wheel 74 carries chain 79 and drives chain wheel 80 secured to shaft 83, the slack of chain 79 being taken up on chain wheel 81 mounted on lever 82 adjustably secured to frame 47. Shaft 83 carries gear wheel 86 and shaft 84 carries gear wheel 85, the gear wheel 86 driving gear wheel 87 and the gear wheel 85 being driven by gear wheel 88. Gear wheels 87, 88 are respectively fixed to the ends of shaft 89 which is mounted in the frames 46, 47. Cam wheel 90 and slotted disc 92 are fixed to the face of gear wheel 86 and cam wheel 91 and slotted disc 93 are fixed to face of gear wheel 85, connecting rods 92', 92' being adjustably fixed by bolts 93', 93' passing through bushes 94, 94 in each slotted disc 90 and 91. Connecting rods 92', 92' are connected to shaft 95 bolted at either end to sliding bearings 96, 96, the latter being slidably mounted on shafts 97, 97' carried by the frames 46, 47 and provided with pins 98, 98 for the attachment of springs 99 whereof the other ends are carried on pins 100, 100 mounted on brackets 101, 101, which are freely mounted on the shaft 95 and respectively closely adjacent to sliding bearings 96, 96. Cross bar 102 fixed at either end to brackets 101, 101 is adapted to carry a perforating blade 103. Pins 104, 104 screwed respectively into frames 52, 53, carry bell-crank levers 105, 105, the said levers being adapted to hold roller 106 carried on shaft 119, and driven by gear wheel 120 in spring pressed relation to the roller under by means of springs 107, 107. Shaft 108 freely mounted in frames 52, 53, carries gear wheels 109, 109 meshing with racks 110, 110 secured respectively to frames 46, 47. Hand wheel 111 is fixed to the end of shaft 108. Shaft 112 carries cam levers 113, 113, the said levers being provided at one end with cam bowls 114, 114 operating on cam noses 115, 115, the flat underside of the other ends of levers 113, 113 being in intimate contact with the bowls 116, 116 secured to brackets 101, 101. Stretcher bars 117, 118 (Figure 1) hold the frames 52, 53 suitably spaced apart.

Figure 4:
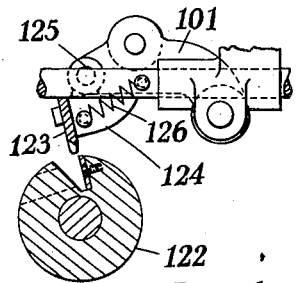
Figure 4 is a detail view in section illustrating the method of cutting or severing sections from the web.
Figure 5:
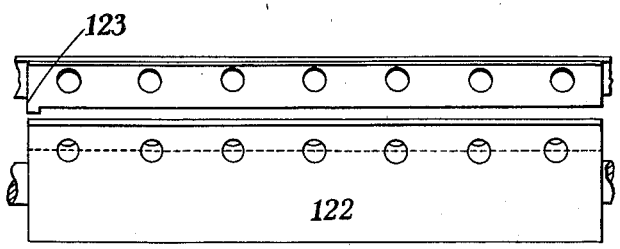
Figure 5 is an end view in part corresponding with Figure 4 showing the relative angle of the reciprocating cutting blade with the fixed knife blade carried by the cylinder.
Figures 6, 7:
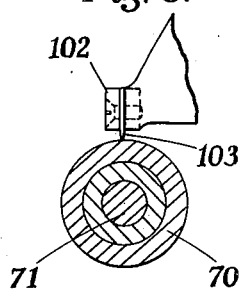
Figure 6 is a detail view in section showing the means for perforating the web by a saw tooth type of blade.
Figure 7 is another view in section of the perforating device, the section being taken at right angles to Figure 6.
Figure 10:
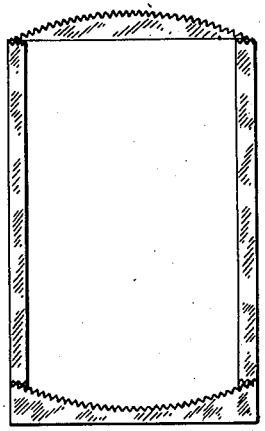
Figures 10 to 14 illustrate examples of bags which may be produced by a mechanical combination according to this invention.
Figure 11:
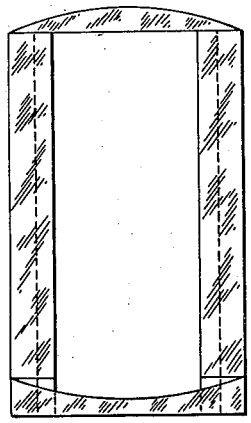
Figure 12:
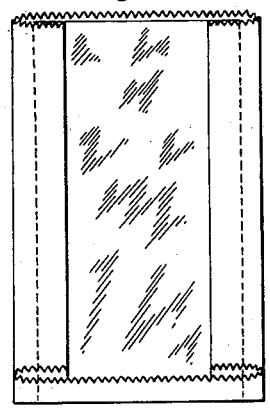
Figure 13:
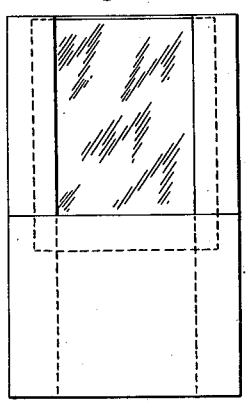
Figure 14:
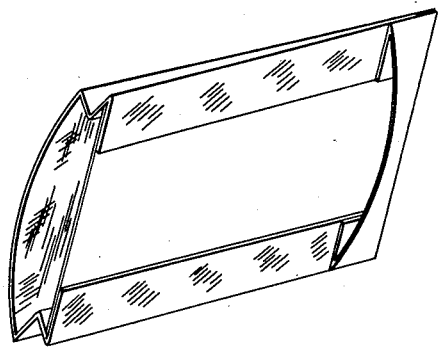
Figure 15:
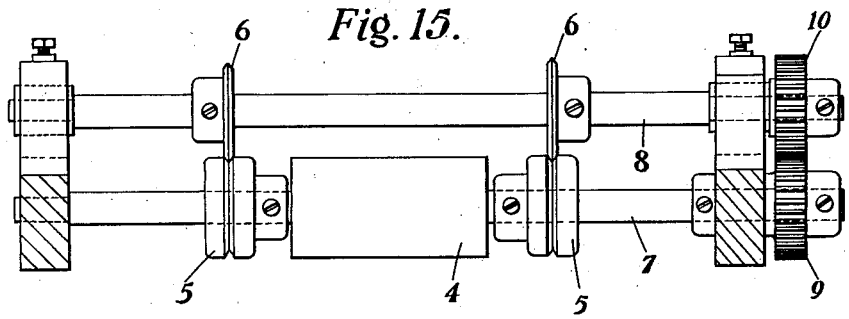
Figure 15 is a plan view in section of the creasing device.
Figure 16:
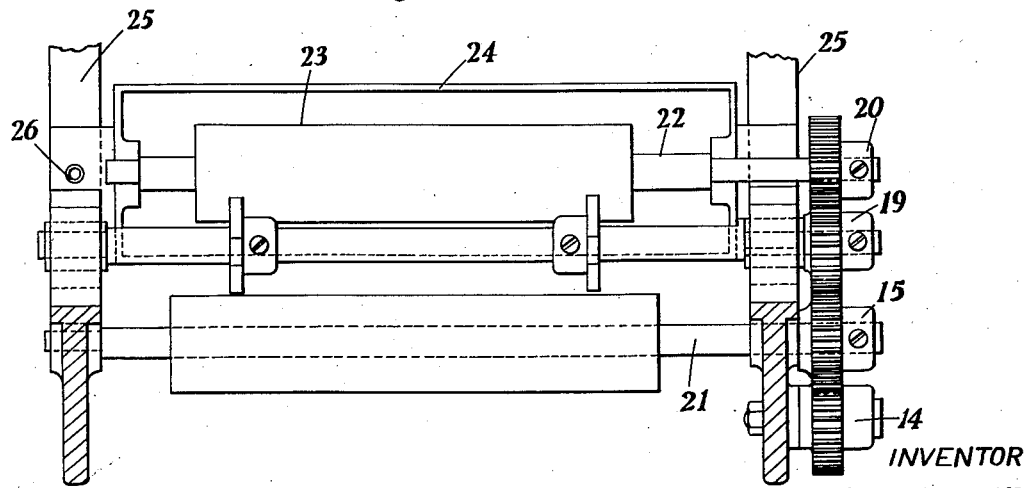
Figure 16 is a plan view in section of the gum applying device.

Referring to Figure 4 the cutting mechanism illustrated comprises thereby the knife provided roll 122 and co-acting knife 123 the latter being carried by brackets 124 hingedly mounted by means of pins 125, on brackets 101, 101, the said brackets being adapted for the reception of the pins 125 instead of bar 102 as previously described, springs 126 holding brackets 124 in spring pressed relation to brackets 101, 101.

The operation of the machine according to the invention is as follows:—

From the reel 1, the material such as paper is led under roll 4, and between the creasing discs 5 and 6 carried on shafts 7 and 8 respectively, the material or paper being led therefrom in a vertical direction between the rolls of the gumming device, the said device receiving its motion from gears 15, 19 and 20.

It is to be understood that the respective operating parts of both creasers and gummers are to be set to suit the width of bag in course of production and according to the character thereof.

From the gumming device the paper is led over rolls 33 and 30 (Figure 2) and under pressure rollers 62, and from thence through the edge folding devices and gumming devices and the other mechanisms of a known bag making machine.

From the roll 66 paper is led over a rubber covered roll 70 whereof the speed of revolution together with the whole of the mechanism carried on frames 46, 47 is adapted for control by variable and/or interchangeable gears 74 mounted on shaft 121, the paper passing from the rubber covered roll 70 over a similar roll on shaft 121 and between the grip of the said roll and roll 106 on shaft 119.

During the operation of the machine, the perforating blade 103 will make a series of to and fro movements due to the setting of the pins 93', 93' respectively in slotted discs 90, 91. The maximum speed of travel of the said perforating blade will arrive when the slots in the discs 90, 91 are in a vertical position and in the said position cams 92, 93 by means of cam noses 115 will cause levers 113 to descend at their further ends and to depress the brackets 101, 101, thus carrying the points of perforation blade 103 into contact with the travelling paper passing over rubber covered roll 70 and imposing thereon a line of perforation.

The arrangement of devices described with reference to Figure 4 may take the place of the rubber covered roller 70 and blade pertaining to the bar 102, a knife provided roller 122 being substituted for the roller 70 and the knife 123 substituted for the perforating blade 103 as hereinbefore described.

Using the perforating blade 103 the paper then passes between the grip of roller 106 and the co-operating roller under the same, the said rollers travelling at a pitch speed which is equal to that of the roll 70.

From this point the paper is led under the roll 36 which is at that moment in the lifted position, developed by the cam 126 co-acting with lever 44, connecting rod 43 and lever 41, operating to lift levers 37 carrying the roll 36. The paper passes then between the grip of roll 36 and roll 33 under the same. The timing of cam 126 is such, that the roll 36 descends and grips the paper almost as soon as the end thereof is between the rolls 36 and 33.

The portion of the machine carried on frames 39, 40 and handling paper from reel 1, is driven by chain 28 driving chain wheel 29 and thus through the train of gears 11, 12 and 31 to gear wheel 75 carried on quadrant lever 76.

As before referred to the gear wheel 74 is an interchangeable one and the variation thereof affects the whole of the mechanism carried between frames 46, 47.

The paper from reel 66 is adapted to form the short face of the completed bag and therefore the speed of travel of that paper through the mechanism carried on frames 46, 47 is less than that of the paper drawn from reel 1 and passing through the mechanism carried on frames 39, 40.

It will now be realized that, upon the paper from reel 66 passing between rolls 33 and 36 and becoming superimposed upon the paper from reel 1, the superior speed of the said rolls and paper and the grip of roller 36 will cause the paper from reel 66 to break or sever at the line of perforation imposed by the blade 103, and that henceforth the paper from reel 1 will carry the detached portion upon itself assisted by pressure rolls 62, 62, 62, 62 and that the further operation of the machine will result in the turning over of the gummed edges of the paper from reel 1 and the adhesively joining of same to the detached portion cut from reel 66 and that the further operation of the bag making machine will result in a bag length becoming detached, the bottom edge of the detached portion being folded and adhesively secured to form the bottom of the bag.

It will be seen that, in order to satisfactorily control the detached portion of the paper from reel 66 whether the same be severed by a cutting or a perforating mechanism the distance from shaft 32 to shaft 121 must be capable of adjustment to suit the length of the severed portion of the paper from reel 66 and to that end the frames 46, 47 are slidably mounted upon frames 52 and 53 and rendered operable by means of the hand wheel 111 so that the said frames 46, 47 may be moved into the required position.

The length of paper required and the speed of the severing mechanism are obtained by selecting the correct diameter gear wheel for the shaft 121 and the correct setting of the pins 93, 93 pertaining to the connecting rods 92, 92.

It will be realized by those engaged in the bag making art, that while with heavy papers the turning over of the edges of the paper from reel 1 will present no difficulty, lighter and thinner papers may require some support and guidance for the correct folding of the previously gummed edges of the paper. The gumming of the said edges of the paper may be performed by the gumming devices illustrated in the accompanying drawings or it may be effected by the devices employed in known bag making machines adapted to operate in accord with the mechanism, the subject of the present specification.

Or, in connection with the gumming of the said edges by the devices as herein described and illustrated rolls of varying diameters having mutilated gumming edges may be employed to the end that the gum may not project beyond the end of the short cut section of paper from reel 66, and that the respective ends of the bag may present a clean appearance. The setting of the gum tank 24 is such that the gumming details operate to effect a kiss contact only.

When employing thin papers they may be supported by means of a split or divided plate 127 (Figures 8 and 9) secured by screws 132 to the guide bar 128 carried on shaft 129 which is mounted in the frame extension 130 and held by set screws 131.

It will be seen that the plate 127 may be interchangeable to suit the various widths of bags, the end of the said plate being adapted to form, if required, the breaking medium for the turned over edges of the paper when this becomes necessary owing to the required finish of the respective ends of the completed bag, the paper from reel 1 passing under the plate and the cut section from reel 66 passing over same, the two papers being held between the grips of rolls 36 and 56 and the respective co-acting rolls under.

The turning over of the edges of the paper from reel 1 may be accomplished by guide rods 133 adapted for adjustment by slotted angle supports 134 mounted on plate 65, or the same may be performed by plates of ploughshare fashion forming part of the known bag making machine.

The plate 65 may be shaped as shown at 135 or 136 (Figures 8 and 9) or be given any other desired shape. A separate shaped plate may also be provided and the same may be carried by and secured to plate 65; or the usual mechanism of a known bag making machine, adapted to form the bag length separating mechanism, may be utilized for the purpose.

It is to be observed however that the mechanism for turning over the edges of the paper and the mechanism for severing the bag lengths of the web from reel 1 form no part of the present invention.

When gusseted bags or block bottom bags are required, their production may be effected by adapting the known mechanism to that end, and similarly the bottom closing of the bag may be effected by adapting the known means to suit the bag being produced.

It will be realized that the combination of known bag forming machines and mechanism adapted for providing a separate detached portion of the bag must be absolutely under control with regard to the speeds of the respective sections.

In the present specification the machine is described and illustrated as being operated by a chain gearing 28, which may be operatively related to a suitable prime mover shafting or the like such as ordinarily adopted with the known bag making machines. The respective sections may, however, be driven by a train of gears or a side shaft and bevel gears or by any other mechanical devices and method of control adapted to effect the driving of the shaft 27 and the operation of the machine according to the invention.

Figures 10 to 14 illustrate several types of bags which may be produced according to the invention.

I claim:—

1. The herein described method of manufacturing bags or envelopes of the kind referred to from two webs of different material which consists in feeding in juxtaposed relation the two webs at independently varying speeds, edge creasing one of the webs, gumming the creased edges, cutting sections of pre-determined length from the other of the webs, severally and periodically moving the said sections into predetermined positions on the edge creased and gummed web, effecting adhesive application of the said sections to the gummed creased edges of the web carrying the same and severing the web between the sections applied thereto into bag forming lengths having relatively varying end overlap.

2. Machine for manufacturing bags or envelopes of the kind herein referred to from two webs of different material which comprises a known mechanism whereof the structure includes means for feeding a single web of the material, means for edge-creasing the web, means for folding the creased edge, means for gumming each said folded edge and means for severing bag forming lengths from the said web and which further comprises a mechanism designed for juxtaposed operative association with the aforesaid known mechanism and including means for feeding a web of material therein differing in character from the web in the known mechanism, means for varying the speed of the said feeding, means for cutting sections from the said web, means for moving the sections to the before-mentioned edge-creased, folded and gummed web, means for causing adhesion of said sections to the said gummed edges prior to the severance of the said edge-creased folded and gummed web, into portions by the means included in the aforesaid known mechanism.

3. Machine for manufacturing bags or envelopes of the kind described from two webs of different material which comprises means for continuously feeding the webs at relatively different speeds, means for edge creasing the faster running web, means for applying adhesive to the said creased edges, means for cutting portions from the slower running web, means for periodically moving the said cut portions into the path of the faster running web, means for effecting the attachment of the said cut portions to the adhesive on the said edges of the faster running web, means for severing the portions of the faster running web having the adhesively attached portions of the slower running web thereon to produce bag forming lengths of varying degree of end overlap.

4. Machine for manufacturing bags or envelopes of the kind described from two webs of different material which comprises mechanism of known kind, whereof the structure includes means for continuously feeding a web of material, means for cutting bag-forming lengths from the said web and means, co-operatively related to the aforesaid mechanism of known kind, for continuously feeding a web of different material, means for varying the speed of feeding said web, means, in the known mechanism, for edge-creasing the web, means for folding the said creased edges and means for gumming the said edges, means, in the co-operatively related means, for cutting predetermined portions from the web pertaining thereto, means for moving the said cut portions toward the web pertaining to the mechanism of known kind and into engagement with the creased, folded and gummed edges of that web, means for effecting adhesive attachment of the said portions in predetermined positions on the said web previous to severing the same by the cutting means comprised in the mechanism of known kind to produce single ply bag forming lengths of relatively varying degree of end over-lap.

5. Machine for manufacturing bags or envelopes of the kind described from two webs of material differing in character which comprises, in co-operative combination, two sections, one of which consists of known mechanism composed of means for supporting a web of material, means for feeding the said web, means for creasing the side edges of the web, means for folding the said edges, means for gumming the folded edges of the web and means for cutting predetermined lengths from the said web, and, the other of which sections consists of means for supporting a web of material, means for feeding the web with a speed variable relatively to the speed of the web pertaining to the section which consists of known mechanism, means for cutting portions from the web pertaining to the aforesaid other section, means for varying the dimensions of the cut portions, means for varying the frequency of such cutting, means for moving the said cut portions into contact with the aforesaid gummed edges of the web pertaining to the known mechanism and means for effecting adhesive attachment of the said web portions in the formation of bag-forming lengths with relatively varying end overlap.

WILLIAM EDWIN ELLENS.